Figure 1:
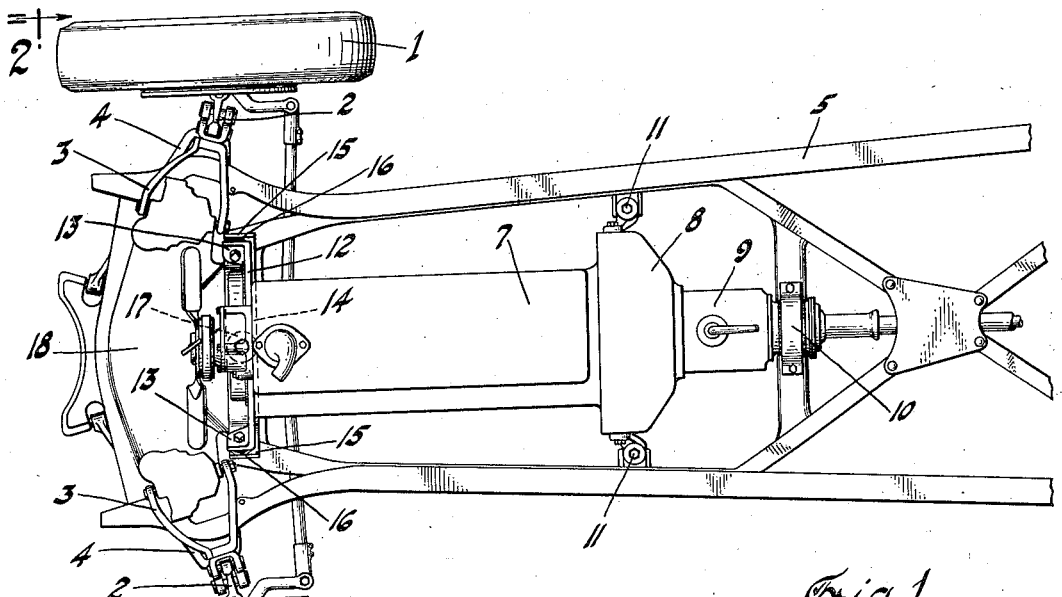

Inventor
Owen M. Nacker

Patented Nov. 26, 1935

2,022,134

UNITED STATES PATENT OFFICE 2,022,134

FRONT MOTOR SUPPORT

Owen M. Nacker, Pleasant Ridge, Mich., assignor to General Motors Corporation, Detroit, Mich., a corporation of Delaware Application November 21, 1934, Serial No. 754,037

4 Claims. (Cl. 248—7)

This invention relates to motor vehicles and particularly to the mounting of an internal combustion engine in the chassis frame or other support.

It is an object of the invention to provide an improved motor vehicle construction whereby road shocks and strains incident to twisting of the chassis frame will not be imposed upon the engine assembly and vibrational forces generated upon engine operation will not be transmitted and amplified through the chassis frame. Soft rubber mounting units have been used heretofore with fairly good results and the present improvement has to do with a more advantageous arrangement and location of the mounting units so that forced movements taking place are more effectively provided for.

Various types of power generating machinery have individual vibrating characteristics, and in the case of a multiple cylinder engine having at one end as a unit therewith, a clutch and change speed gearing with driving connections to the rear wheels, as is conventional automobile practice, an objectionable vibration at low speed and high load, occurs about a longitudinal axis, which because of the distribution of mass, is inclined downwardly from front to rear. The location of this axis is dependent upon the design and construction of a given power plant and its installation in the chassis frame, but after it is once established by trial, the mounting units may be arranged in definite relation thereto. The mounting of the rear of the power plant involves no difficult problem for the reason that the connection may be located close to the axis of oscillation or at a point of neutral or least motion, and the present invention relates more to the mounting at the front of the engine where the axis is usually much higher than the engine crankshaft and at a point inconvenient for the location of a mounting unit. In this connection it is desirable to keep the front mounting in the vicinity of the chassis frame rather than on a standard rising considerably above the frame so as to avoid multiplication of the effects of frame weaving and increased strain on the power plant as a result of the leverage of the vertical standard.

To this end there is contemplated the interposition between the frame and engine of a transverse bar or weight transmitting member having divergent end portions which provide bearing surfaces cooperating with corresponding or mating surfaces on the engine and extending in planes substantially normal to lines radiating from the axis of oscillation, with soft rubber pads between the mating surfaces, together with a resilient connection mounting the weight carrying member on the frame adjacent the longitudinal center line of the vehicle and the axis about which the chassis frame tends to twist.

Figure 2:
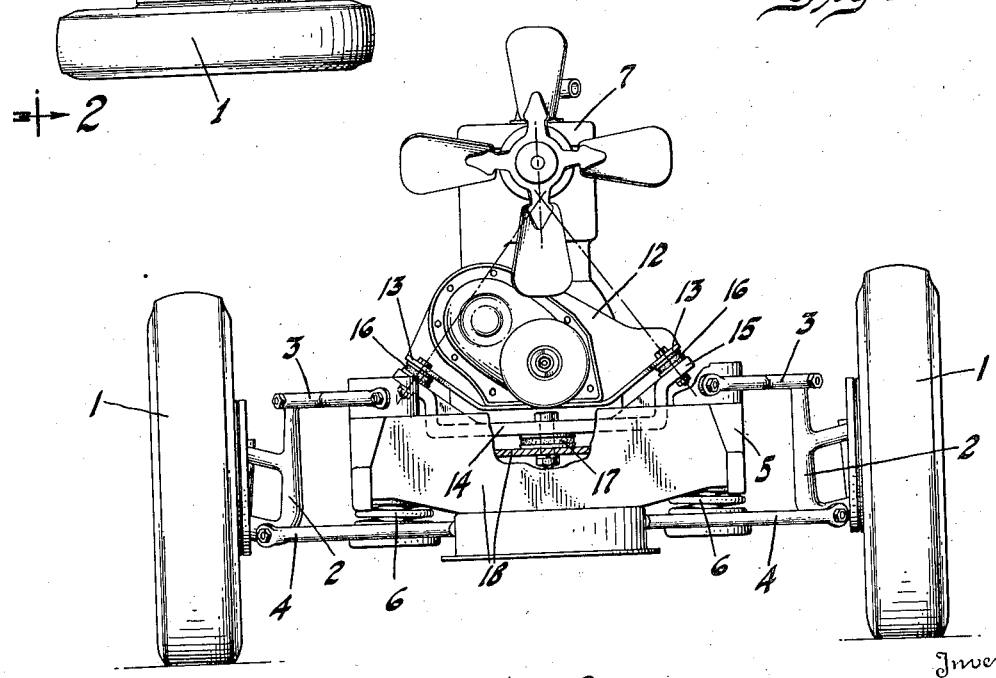

For a better understanding of the invention, reference may be made to the accompanying drawing illustrating its preferred embodiment and wherein Figure 1 is a top plan view of a front portion of the chassis frame with an engine mounted therein, and Figure 2 is a front elevation with parts in section looking in the direction of the arrows on line 2—2 of Figure 1.

Referring to the drawing there is illustrated an independent wheel suspension system, such as is used on the 1934 Cadillac automobile. The spindle for each wheel 1 is swiveled in a fork 2 connected through parallel swinging links 3 and 4 with the chassis frame 5, the load being taken through a coil spring 6 interposed between the chassis frame and the lowermost link 4. As in the case of the more conventional type of springing, travel over uneven roads tends to bend the longitudinal members of the frame so that at the front, one side of the frame is sometimes higher or lower than the other side. This twisting and weaving of the frame tends to throw strains in the associated parts including the engine, and in order to free the engine from the effects of frame weaving, it is proposed to mount the engine as shown in the drawing. Here the engine 7 has a unit therewith the clutch housing 8 and the transmission 9, and the rear end of the power plant is secured in a suitable manner in the frame. The rear mounting, for example, may comprise a bracket 10 encircling an extension of the transmission casing 9 and embodying a cushioning ring of rubber or the like and additionally each side of the bell housing 8 may be secured to the chassis frame through a cushioning unit 11.

At the front of the engine, a plate 12 extends laterally at each side and near the ends is provided with forwardly extending flanges 13 inclined and divergently related to each other so as to extend in planes that are tangent to a circle or circle struck from the previously located axis of oscillation of the engine. Immediately below the plate 12 is a weight carrying member or bar 14 having outturned and inclined end portions 15 to provide bearing seats or surfaces that mate with the inclined flanges 13. Interposed between the mating surfaces is a cushioning unit 16 which may consist of a pad or block of relatively soft rubber secured in place by means of a hold down bolt or by being vulcanized to retainer plates which are in turn secured to the seating portions 13 and 15. A similar mounting unit 17 is used to secure the bar 14 to the cross member 18 of the chassis frame on the vehicle center line and adjacent the axis about which the frame tends to weave.

With this arrangement of parts it will be apparent that the bearing surfaces are positioned in planes corresponding to the directions of major movements to be cushioned, and that the rubber pads associated with such surfaces act in shear, wherefore, the vibratory forces which tend either to move the engine laterally or about the axis of oscillation are most effectively cushioned and damped, and that, furthermore, the resilient connections and particularly the rubber pad 17 accommodates tilting movement of the bar 14 relative to the frame member 18 to minimize the effects of frame weaving on the engine.

I claim:

1. In a motor vehicle, a chassis having a tendency to wabble about a longitudinal axis at the front end due to road reaction, an engine, means to resiliently mount the front of the engine in the front of the chassis, said means including a member having divergently disposed seats spaced on opposite sides of the vehicle center line, means resiliently mounting the engine on said seats to accommodate relative movement in the direction of the seats and means resiliently mounting said member to the chassis at a point intermediate the seats and substantially coincident with said axis of chassis wabble.

2. Means to resiliently mount the front of an engine assembly in the front of a chassis frame assembly, including a weight carrying element having a pair of divergently disposed seats spaced transversely of the engine assembly center line and in planes substantially normal to lines radiating from the natural axis about which the engine tends to turn, mating seats on the engine assembly, means joining said seats for relative movement in the direction of their extent, and means intermediate said seats movably joining said element to the chassis frame assembly.

3. In the mounting of an engine assembly in a frame assembly, a transversely extending weight carrying member having its end portions lying in planes divergently related, rubber pads between said end portions and correspondingly related portions on the engine assembly, and a rubber pad intermediate said end portions and between said member and the frame assembly.

4. In combination, a support, an engine having a pair of transversely spaced mounting surfaces extending in planes substantially tangent to a circle or circles struck from the natural longitudinal axis of engine vibration, a weight carrying member also having mounting surfaces which mate and correspond to the first mentioned surfaces, yieldable pads interposed between said mating surfaces, and means yieldably connecting said weight carrying member to the support.

OWEN M. NACKER.